(12) United States Patent
Boyer et al.

(10) Patent No.: US 10,589,934 B2
(45) Date of Patent: Mar. 17, 2020

(54) METHOD AND APPARATUS FOR RETAINING CONTENTS IN A CONVEYED CONTAINER

(71) Applicants: Thomas P. Boyer, Fort Salonga, NY (US); Timothy William Limer, Vestal, NY (US); Thomas J. Donovan, Hallstead, PA (US); Wayne D. Klossner, Vestal, NY (US); Todd E. Bower, Endicott, NY (US); Mark Jones, New Milford, PA (US); David Timothy Royce, Binghamton, NY (US)

(72) Inventors: Thomas P. Boyer, Fort Salonga, NY (US); Timothy William Limer, Vestal, NY (US); Thomas J. Donovan, Hallstead, PA (US); Wayne D. Klossner, Vestal, NY (US); Todd E. Bower, Endicott, NY (US); Mark Jones, New Milford, PA (US); David Timothy Royce, Binghamton, NY (US)

( * ) Notice: Subject to any disclaimer, the term of this patent is extended or adjusted under 35 U.S.C. 154(b) by 0 days.

(21) Appl. No.: 15/255,096

(22) Filed: Sep. 1, 2016

(65) Prior Publication Data
US 2018/0057266 A1 Mar. 1, 2018

(51) Int. Cl.
*B65G 17/32* (2006.01)

(52) U.S. Cl.
CPC ...... *B65G 17/32* (2013.01); *B65G 2201/0261* (2013.01)

(58) Field of Classification Search
CPC ..... B65G 17/323; B65G 17/002; B65G 17/36
USPC ... 198/867.05, 867.11, 867.12, 473.1, 474.1, 198/803.15, 803.11, 803.14; 211/76
See application file for complete search history.

(56) References Cited

U.S. PATENT DOCUMENTS

| | | | | | |
|---|---|---|---|---|---|
| 2,902,170 | A | * | 9/1959 | Miller | B01L 9/06 206/379 |
| 3,342,304 | A | * | 9/1967 | Greulich | B65B 35/44 134/82 |
| 3,904,035 | A | * | 9/1975 | Metzler | B25H 3/003 206/379 |
| 4,305,496 | A | * | 12/1981 | Hoppmann | B65B 35/26 198/418.4 |
| 5,579,928 | A | * | 12/1996 | Anukwuem | B01L 9/06 206/443 |
| 7,132,082 | B2 | * | 11/2006 | Aviles | B01L 9/06 211/74 |
| 8,215,480 | B2 | * | 7/2012 | Qian | B01L 9/06 206/363 |
| 2013/0214469 | A1 | * | 8/2013 | Terzini | B23Q 1/032 269/287 |

* cited by examiner

*Primary Examiner* — William R Harp

(57) ABSTRACT

A novel puck and cover assembly and method for retaining the contents of a container, such as a prescription bottle, during processing and order-filling operations. The puck and cover assembly allows access to the opening of a container when required to perform operations, and automatically returns to cover the opening of a container when operations are completed, to prevent loss of any container contents.

23 Claims, 6 Drawing Sheets

METHOD AND APPARATUS FOR RETAINING CONTENTS IN A CONVEYED CONTAINER

FIELD OF THE INVENTION

The invention pertains to apparatus and methods for covering containers during their movement by a conveyor system and, more particularly, to a puck for holding a container being conveyed and automatically covering and uncovering the container as required as it is conveyed.

BACKGROUND OF THE INVENTION

A wide variety of consumer products are packaged in bottles, vials, cans, or other containers using conveyor systems and automated equipment, to increase the efficiency and repeatability of the packaging process, and the resulting quality of the delivered product. In some cases, the size and scale of bottles, vials, cans, or containers are able to be manipulated through an automated system of conveyors and handling equipment without difficulty. In other cases, the size, weight, or shape of the containers may present more difficulty for automated handling systems, particularly as speeds of automated equipment are increased for higher throughput. For example, empty, light weight plastic containers may not have enough mass to keep themselves upright, when accelerated along a conveyor system, around corners, and through handling equipment, and can easily tip, jam, fly off, or orient themselves awkwardly and inconsistently for the handling equipment. If such containers are already filled with a product, such actions may result in spilling some or all of the container's contents.

One solution that has been implemented involves placing such containers, bottles, vials, or cans within a carrier, or puck. This provides stability and consistent orientation throughout the handling system, and particularly at critical steps such as filling, labeling, weighing, capping, and the like. A carrier or puck, may accommodate multiple sizes and shapes of containers through careful design of its interior, or through the use of tailored inserts. In the example of automated pharmacy equipment for filling prescriptions, pucks are used to hold prescription bottles or vials of various sizes. The pucks provide a consistent weight and shape that can be manipulated by the handling equipment, while keeping the container upright and in a known orientation. Using technology that can identify each individual puck and container combination, such as, but not limited to, bar code identification or radio-frequency identification (RFID), the automated equipment is capable of filling each container with the correct medication from a matrix of dispensers as required by each prescription. As the individual filled container associated with each prescription proceeds from the dispensing station to subsequent operations, such as labeling and capping, it is commonplace for adjacent pucks to hold bottles filled with entirely different and unrelated prescriptions.

One problem that is observed in automated systems as described above, occurs as the pucks bump into one another along the course of the conveyor system. Occasionally, collisions between pucks cause individual pills, capsules, tablets or medications to jump out of a bottle. In a high volume operation, this event can happen frequently enough to produce a sizeable quantity of medications around the floor of the conveyor equipment. Such spilled medications must be discarded. In some cases, very expensive medications may be discarded. Also, some of the prescriptions that leave the facility may be short of the correct quantity.

Another possible result may be cross-contamination, where the momentum incurred by a dose of medication causes it to jump from one bottle to another. While the probability of this occurrence is much lower than landing on the floor, the liability associated with a dose of the wrong medication cross-contaminating a prescription may be significant, and high volume automated operations increase the opportunity for cross-contamination to occur.

SUMMARY OF THE INVENTION

In accordance with the present invention there is provided a method and an apparatus for preventing the accidental loss of contents from a conveyed container, and preventing cross-contamination of products or medications. Novel pucks are provided with attached covers that may selectively be moved from a closed to an open orientation where the open top of a container is accessible to automated filling, capping, or other similar equipment. Conversely, the attached cover may be orientated in a closed orientation whereby any content of the container is retained therewithin. The attached covers are selectively moved from the open to the closed orientation or the closed to the open orientation automatically by the conveyor system.

It is, therefore, an object of the invention to provide a method and apparatus to prevent cross-contamination of products, including medications, in adjacent containers along a conveyor system.

It is another object of the invention to provide a means and apparatus to reduce or eliminate accidental loss of product from a bottle or container.

It is an additional object of the invention to provide a puck having a selectively movable cover to temporarily retain bottle or container contents.

It is a further object of the invention to provide a means for temporarily removing the cover from a covered puck for operations requiring access to the bottle or container opening.

It is a still further object of the invention to provide a means for reliably re-engaging the cover of the covered puck when access to the bottle or container opening is no longer required.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The present invention provides a novel puck and cover assembly and method for temporarily retaining the contents of a container, such as a prescription bottle, during processing and order-filling operations. The cover assembly may be automatically moved from a closed to an open orientation whereby the open top of the container is made accessible to automated filling equipment or the like. Alternately, the cover assembly may be moved to a closed orientation such that any contents (e.g., medicaments) are retained in the container.

Figure 1:
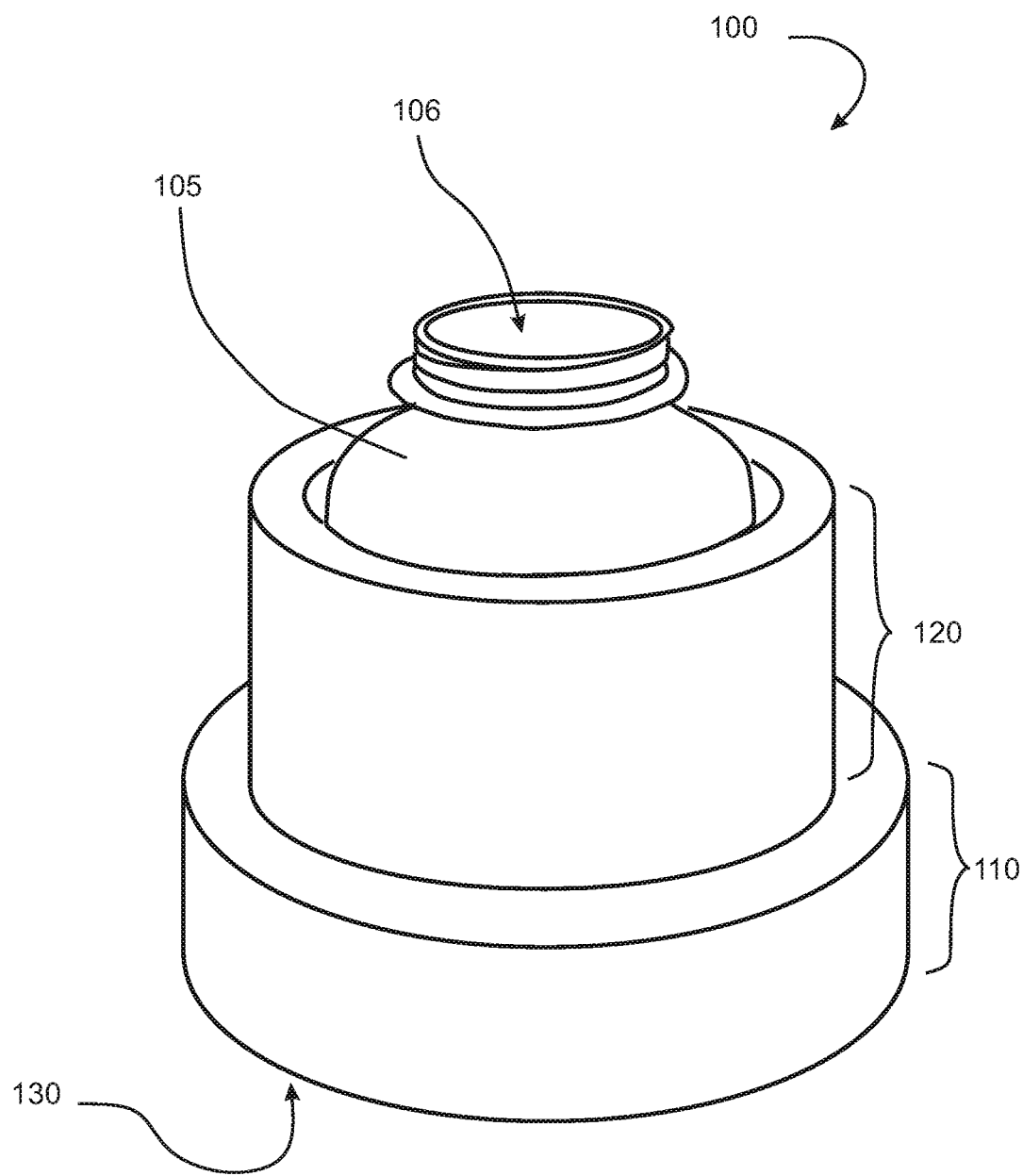
FIG. 1 is a front perspective, schematic view of a prior art puck shown holding a typical prescription bottle.

Referring first to FIG. 1, there is shown a front perspective, schematic view of a prior art puck (100) holding a container (105), such as a prescription bottle or vial, having an opening (106) at the top of the container (105). The prior art puck (100) comprises an upper portion (120) that retains container (105), and a lower portion (110) having a relatively larger diameter than upper portion (120). The lower portion (110) provides stability to the puck (100) and container (105) by contribution to a low center of gravity, and it presents a sufficient surface area at the bottom of the puck (130) to interact with a conveyor system (not shown). Additionally, the lower portion (110) acts a bumper that can be easily guided through a conveyor system that requires changes in direction, and transitions from one conveyor belt or track, to another, without tipping or jamming.

Figure 2:
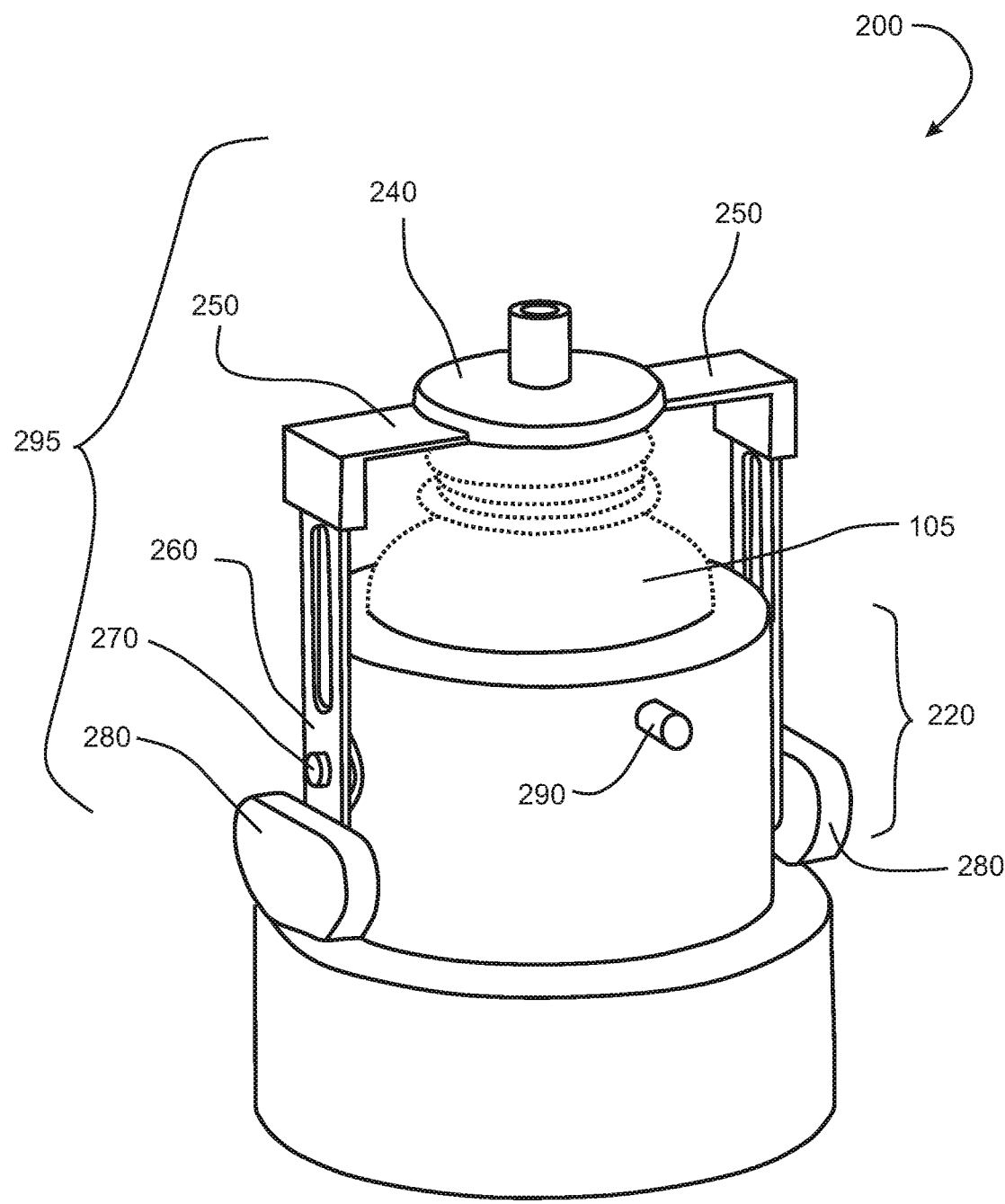
FIG. 2 is a front perspective, schematic view of a novel puck and cover assembly, shown holding a prescription bottle.

Referring now also to FIG. 2, there is shown a front perspective, schematic view of a novel puck and cover assembly (200), holding a container (105), such as a prescription bottle or vial. Container (105) forms no part of the present invention and is included to better show the operation of novel puck (200). As used herein, the term container is intended to refer to vials, bottles, or any other vessel suitable for delivering a product, typically a pharmaceutical, to an end-user (e.g., a patient). In this embodiment, a container cover (240) is attached to two horizontal supports (250) on opposite sides of the bottle cover (240). The horizontal supports (250) are also attached to the top of two vertical pivot arms (260). The vertical pivot arms (260) are further attached to the upper portion (220) the puck and cover assembly (200) at pivot points (270) situated on opposite sides of the upper portion (220). Counterweights (280) are attached to the pivot arms (260) at a position below the pivot points (270). The combination of counterweights (280), pivot arms (260), horizontal supports (250), and container cover (240) forms puck cover assembly (295). Puck cover assembly (295) may rotate as a single subassembly about pivot points (270). The counterweights (280) are attached to the lower end of the vertical pivot arms (260), below the pivot points (270), and are sized and configured to maintain the position of the bottle cover (240) above the top opening (106 in FIG. 1) of the container (105).

While a cylindrical puck has been shown for purposes of disclosure, it will be recognized by those of skill in the art that pucks having square, rectangular, or polygonal footprints could be readily substituted therefor. In puck (200) upper portion (220) of puck (200) has a smaller diameter than lower portion (210). In pucks having non-circular cross-sections, the terms "smaller dimension" and "larger dimension" is used to denote that an upper and lower portions (220, 210) have relatively smaller and larger cross-sectional areas.

Figure 4:
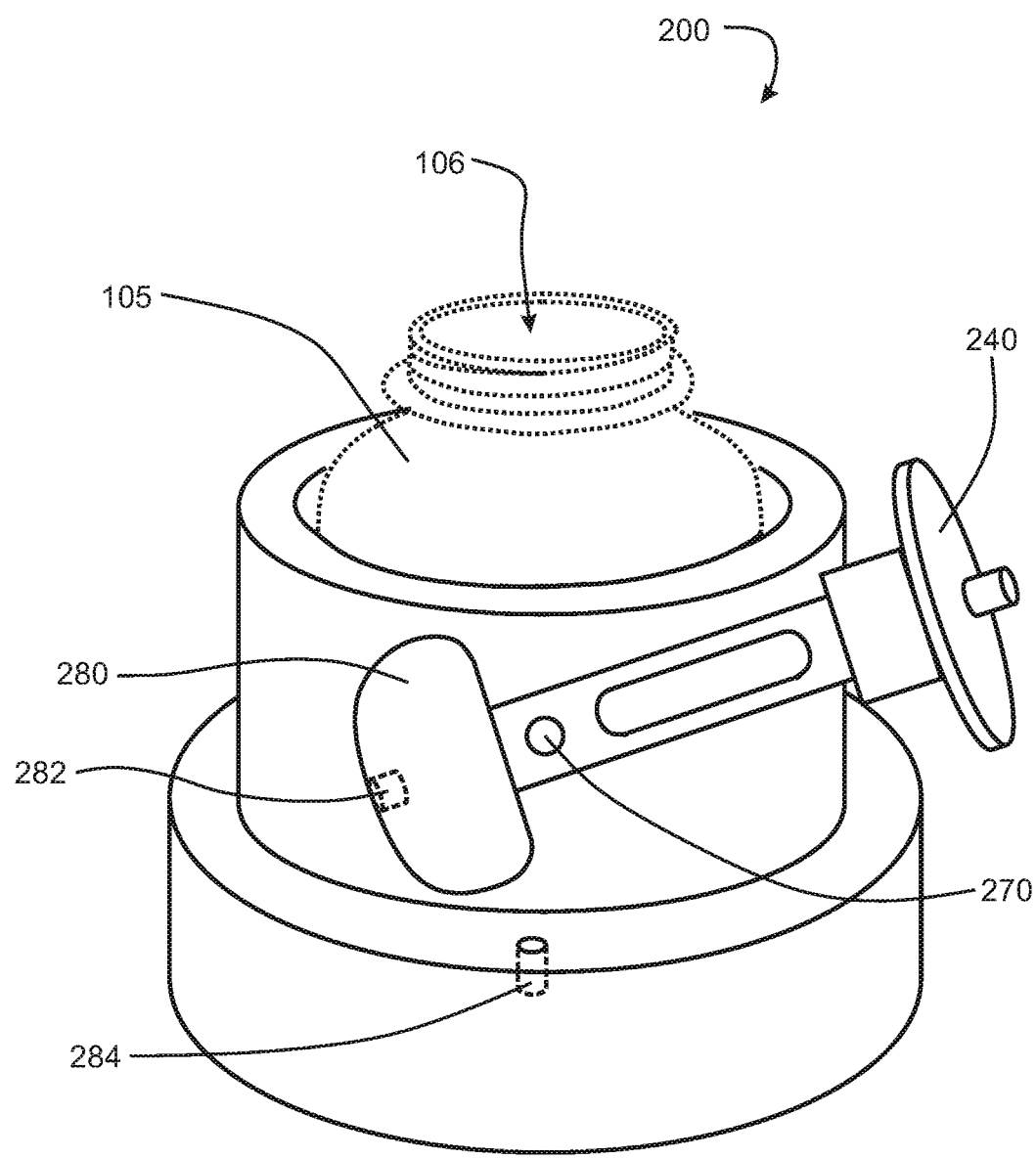
FIG. 4 is a side, schematic view of novel puck and cover assembly of FIG. 2, holding a prescription bottle, with the cover assembly moved to allow access to the top opening of the prescription bottle.

This embodiment of the novel puck and cover assembly (200) incorporates a rotational orientation pin (290) designed to ensure that horizontal supports (250) are properly oriented relative to a mechanism, not shown, established to rotate the puck cover assembly (295) to an open position as shown in FIG. 4. The mechanism, not shown, typically forms a part of the conveyor system.

Figure 3:
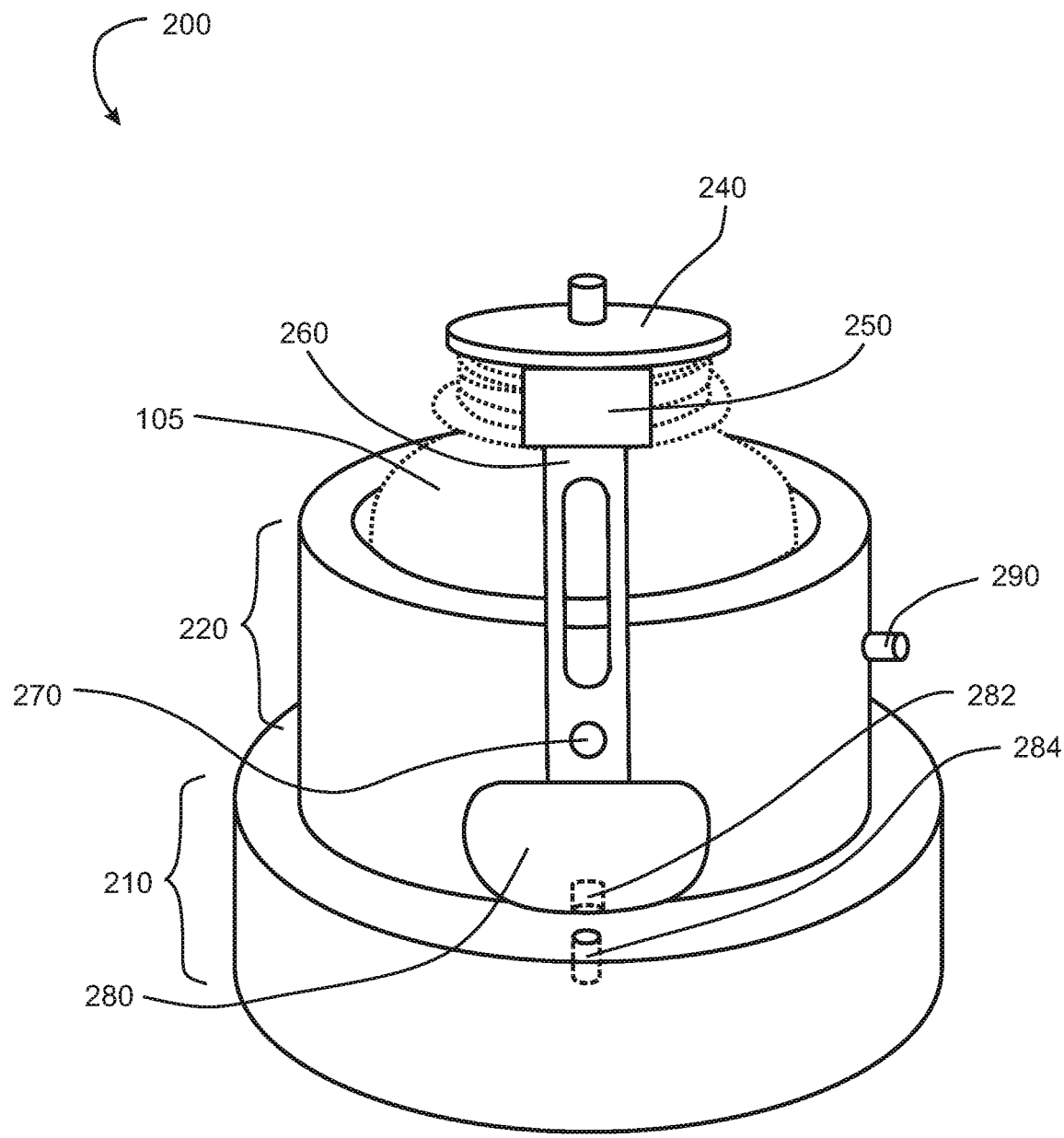
FIG. 3 is a side perspective, schematic view of novel puck and cover assembly of FIG. 2.

Referring now also to FIG. 3, there is shown a side perspective, schematic view of the novel puck and cover assembly (200) of FIG. 2. Located at the bottom, center of the counterweights (280) are magnets (282), provided to produce a dampening effect to the motion of the puck cover assembly (295 in FIG. 2). The magnets (282) are attracted to pieces of metal or opposite pole magnets (284) positioned in the lower portion (210) of puck (200). The pieces of metal or opposite pole magnets (284) are placed in the lower portion (210) below the counterweights (280) and magnets (282) such that they dampen rotational oscillation of the puck cover assembly (295 in FIG. 2) when the cover (240) is positioned directly above the top opening (106 in FIG. 1) of the container (105). In the absence of a dampening mechanism, rotational oscillation of the puck cover assembly could occur during random collisions, such as with other puck and cover assemblies (200) travelling along the conveyor system, or with components of the conveyor system itself. Most significantly, after the puck cover assembly (295 in FIG. 2) has been rotated to perform an operation, it is released. Without a dampening mechanism, the puck cover assembly could oscillate back and forth several times, partially defeating the purpose of the invention (i.e., temporarily retaining the contents of container (105).

Referring now also to FIG. 4, there is shown a side perspective, schematic view of novel puck and cover assembly (200) holding a container, with the puck cover assembly (295) moved to allow access to the top opening (106) of the container (105). In FIG. 4, the puck cover assembly (295) is shown rotated clockwise about the pivot point (270), providing access to the opening (106) of container (105) for performing operations such as filling or capping the container, for example. While clockwise rotation of puck cover assembly (295) is show for purposes of disclosure, it should be noted that puck cover assembly (295) could readily be rotated counterclockwise.

At appropriate stations in the conveyor system, a mechanism rotates the puck cover assembly to provide access for filling, capping, or other operations that require access to the opening (106) of container (105). Subsequent to such operations, puck cover assembly (295) is returned to its closed orientation whereby container cover (240) is maintained in that position above the opening (106) of the container (105), thereby preventing any loss of contents as the puck and cover assembly (200) as it conveyed along an automated conveyor system.

Figure 5:
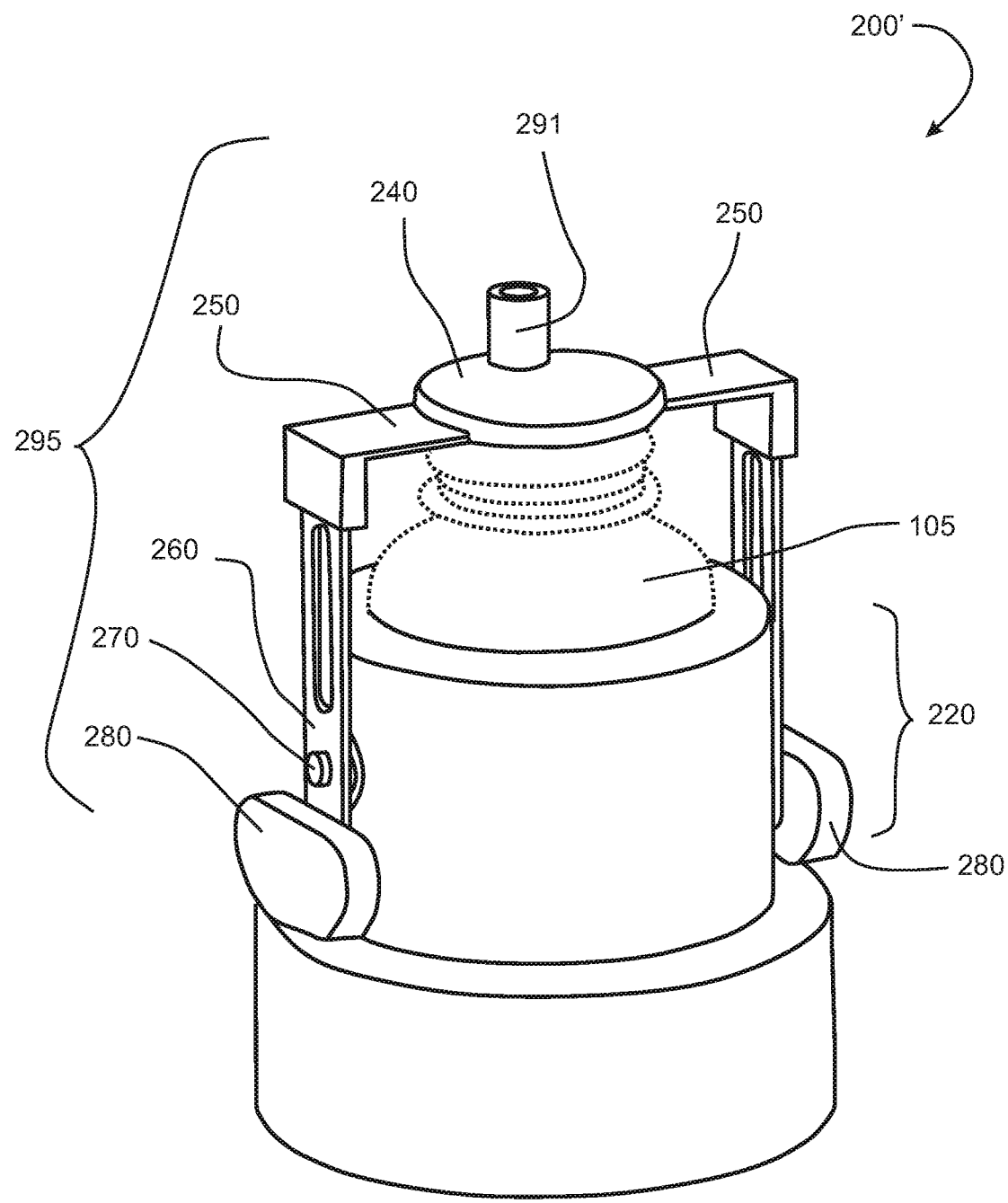
FIG. 5 is a front perspective, schematic view of another embodiment of a novel puck and cover assembly, shown holding a prescription bottle.

Referring now also to FIG. 5, there is shown a front perspective, schematic view of an alternate embodiment novel puck and cover assembly (200'), holding a container (105), such as a prescription bottle or vial. Container (105) forms no part of the present invention and is included to better show the operation of novel puck (200'). In this embodiment, a container cover (240) is attached to two horizontal supports (250) on opposite sides of the bottle cover (240). The horizontal supports (250) are also attached to the top of two vertical pivot arms (260). The vertical pivot arms (260) are further attached to the upper portion (220) of the puck and cover assembly (200) at pivot points (270) situated on opposite sides of the upper portion (220). Counterweights (280) are attached to the pivot arms (260) at a position below the pivot points (270). The combination of counterweights (280), pivot arms (260), horizontal supports (250), and container cover (240) forms puck cover assembly (295). Puck cover assembly (295) may rotate as a single subassembly about pivot points (270). The counterweights (280) are attached to the lower end of the vertical pivot arms (260), below the pivot points (270), and are sized and configured to maintain the position of the bottle cover (240) above the top opening (106 in FIG. 1) of the container (105).

While a cylindrical puck has been shown for purposes of disclosure, it will be recognized by those of skill in the art that pucks having square, rectangular, or polygonal footprints could be readily substituted therefor. In puck (200') upper portion (220) of puck (200) has a smaller diameter than lower portion (210). In pucks having non-circular cross-sections, the terms "smaller dimension" and "larger dimension" is used to denote that an upper and lower portions (220, 210) have relatively smaller and larger cross-sectional areas.

This embodiment of the novel puck and cover assembly (200') incorporates a rotational orientation post (291), located toward an edge of the container cover (240), orthogonal to the axis of the horizontal supports (250). The rotational orientation post (291), interacting with an external fixture included in the conveyor system, serves to rotate the puck and cover assembly (200') to ensure that horizontal supports (250) are properly oriented relative to a mechanism, not shown, established to rotate the puck cover assembly (295) to an open position as shown in FIG. 4. The mechanism, not shown, typically forms a part of the conveyor system. The conveyor system, however, form no part of the instant invention.

Figure 6:
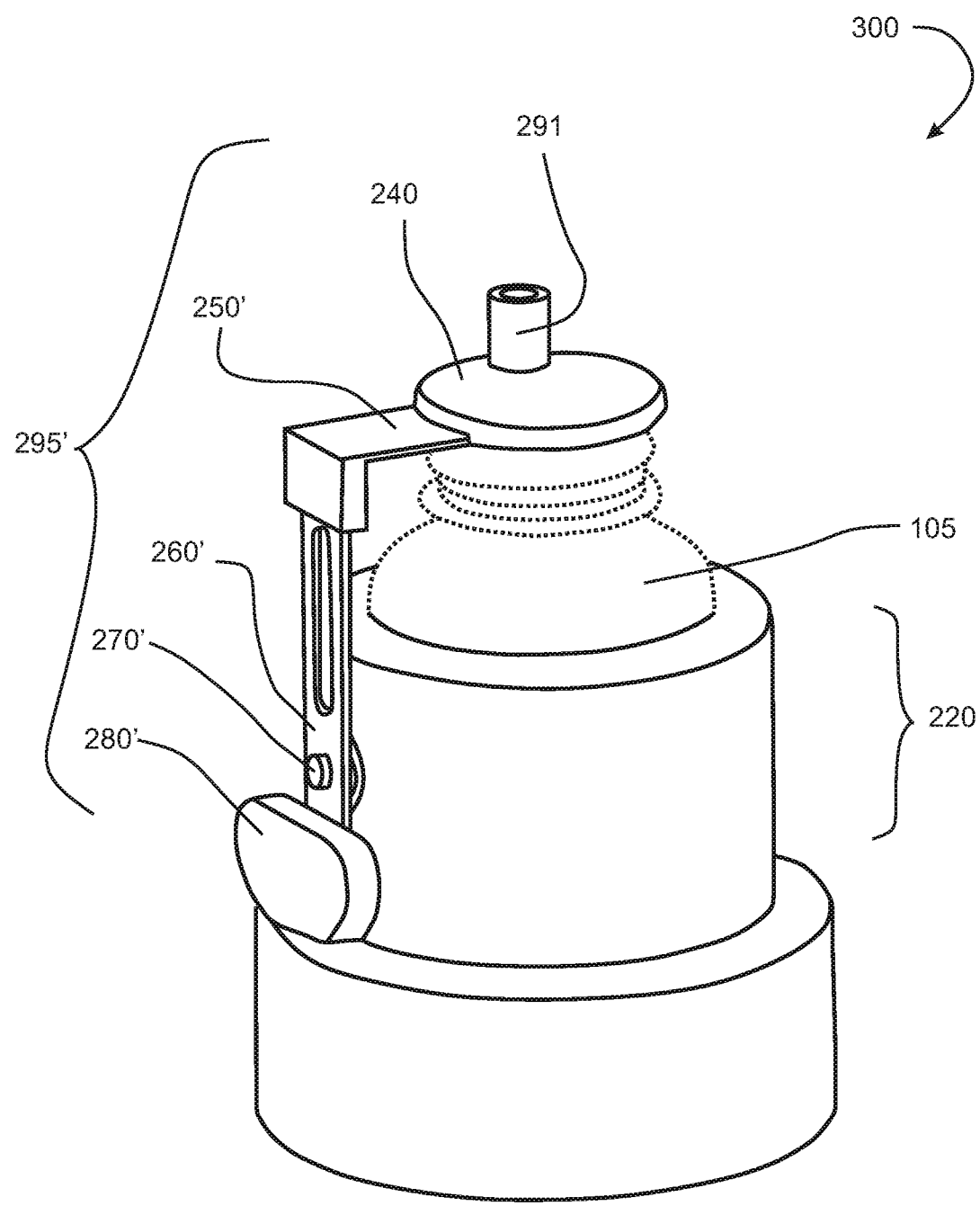
FIG. 6 is a front perspective, schematic view of an alternate embodiment novel puck and cover assembly.

Referring now also to FIG. 6, there is shown a front perspective, schematic view of an alternate embodiment novel puck and cover assembly (300), holding a container (105), such as a prescription bottle or vial. Container (105) forms no part of the present invention and is included to better show the operation of novel puck (300). In this embodiment, a container cover (240) is attached to a horizontal support (250'). The horizontal support (250') is also attached to the top of a vertical pivot arm (260'). The vertical pivot arm (260') is further attached to the upper portion (220) of the puck and cover assembly (300) at a pivot point (270') situated on the outer vertical surface (221) of the upper portion (220). A counterweight (280') is attached to the pivot arm (260') at a position below the pivot point (270'). The combination of the counterweight (280'), pivot arm (260'), horizontal support (250'), and container cover (240) forms puck cover assembly (295'). Puck cover assembly (295') may rotate as a single subassembly about pivot point (270'). The counterweight (280') is attached to the lower end of the vertical pivot arm (260'), below the pivot point (270'), and is sized and configured to maintain the position of the bottle cover (240) above the top opening (106 in FIG. 1) of the container (105).

This embodiment of the novel puck and cover assembly (300) incorporates a rotational orientation post (291), located toward an edge of the container cover (240), orthogonal to the axis of the horizontal support (250'). The rotational orientation post (291), interacting with an external fixture included in the conveyor system, serves to rotate the puck and cover assembly (300) to ensure that horizontal support (250') is properly oriented relative to a mechanism, not shown, established to rotate the puck cover assembly (295') to an open position as shown in FIG. 4. The mechanism, not shown, typically forms a part of the conveyor system. The conveyor system, however, form no part of the instant invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for preventing loss of contents from a container while container is conveyed though an automated system comprising:
 a) a puck having an lower portion having a first dimension and an upper portion having a second dimension, said first dimension being larger than said second dimension, said upper portion having a top surface with an opening therein, said opening being sized and adapted to receive and retain a container therein;
 b) a moveable puck cover assembly comprising:
  i: a planar container cover,
  ii: a pair of horizontal supports each having a proximal end fixed to said container cover and outwardly therefrom and diametrically opposed to one another;
  iii: a pair of vertical pivot arms each having a proximal end connected to a distal end of one of said pair of horizontal supports;
  iv: a pair of counterbalance weights, each of said pair of counterbalance weights being attached at a distal end of a respective one of said pair of vertical pivot arms; and
  v: a first portion of a pivot system disposed between said distal end and said proximal end of each of said pair of vertical pivot arms;
 c) a pair of second portions of a pivot system disposed on an outer vertical surface of said lower portion of said puck, said second portions of said pivot system interacting with respective ones of said first portions of said pivot systems to allow said movable puck cover assembly to move between a first orientation wherein said planar container cover is positioned over said opening in said top surface and a second orientation wherein said opening in said top surface is uncovered.

2. The apparatus for preventing loss of contents from a container while container is conveyed though an automated system as recited in claim 1, further comprising:
 d) means for holding said moveable puck cover assembly in said first orientation.

3. The apparatus for preventing loss of contents from a container while container is conveyed though an automated system as recited in claim 2, wherein said means for holding said moveable puck cover assembly in said first orientation comprises:
 i: a first ferromagnetic structure disposed centrally on a downfacing surface on at least one of said pair of counterweights; and
 ii: a second ferromagnetic structure disposed in an upfacing surface of said lower portion of said puck directly beneath said first ferromagnetic structure when said moveable puck cover assembly in said first orientation.

4. The apparatus for preventing loss of contents from a container while container is conveyed though an automated system as recited in claim 3, wherein at least one of said first ferromagnetic structure and said second ferromagnetic structure comprises a magnet.

5. The apparatus for preventing loss of contents from a container while container is conveyed though an automated system as recited in claim 4, wherein when said first ferromagnetic structure comprises a magnet, said second ferromagnetic structure comprises one selected from the group: a magnet of an opposite polarity to said magnet comprising said first ferromagnetic structure, and a ferromagnetic metal.

6. The apparatus for preventing loss of contents from a container while container is conveyed though an automated system as recited in claim 4, wherein when said first ferromagnetic structure comprises a ferromagnetic material, said second ferromagnetic structure comprises a magnet.

7. The apparatus for preventing loss of contents from a container while container is conveyed though an automated system as recited in claim 1, wherein said moveable puck cover assembly is caused to move between said first orientation and said second orientation by a first externally imposed force.

8. The apparatus for preventing loss of contents from a container while container is conveyed though an automated system as recited in claim 7, wherein said moveable puck cover assembly is caused to move between said second orientation and said first orientation by one selected from the group: a second, different externally imposed force, and withdrawal of said first externally imposed force.

9. The apparatus for preventing loss of contents from a container while container is conveyed though an automated system as recited in claim 1, further comprising:
  d) a container adapter for insertion into said opening in said top surface of said upper portion to adapt said opening to receive and retain a container having at least one different physical characteristic selected from the group: a different diameter, and a different height.

10. The apparatus for preventing loss of contents from a container while container is conveyed though an automated system as recited in claim 1, further comprising:
  d) an orienting pin disposed at a location chosen from the group: on said upper portion of said puck, on said lower portion of said puck, and on said planar container cover.

11. An apparatus for preventing loss of contents from a container while container is conveyed though an automated system comprising:
  a) a puck having an lower portion having a first dimension and an upper portion having a second dimension, said first dimension being larger than said second dimension, said upper portion having a top surface with an opening therein, said opening being sized and adapted to receive and retain a container therein;
  b) a moveable puck cover assembly comprising:
    i: a planar container cover;
    ii: a horizontal support having a proximal end fixed to said container cover and extending outwardly therefrom;
    iii: a vertical pivot arm having a proximal end connected to a distal end of one of said horizontal support;
    iv: a counterbalance weight, said counterbalance weight being attached at a distal end of vertical pivot arm; and
    v: a first portion of a pivot system disposed between said distal end and said proximal end of vertical pivot arm;
  c) a second portion of a pivot system disposed on an outer vertical surface of said lower portion of said puck, said second portion of said pivot system interacting with said first portion of said pivot system to allow said movable puck cover assembly to move between a first orientation wherein said planar container cover is positioned over said opening in said top surface and a second orientation wherein said opening in said top surface is uncovered.

12. The apparatus for preventing loss of contents from a container while container is conveyed though an automated system as recited in claim 11, further comprising:
  d) means for holding said moveable puck cover assembly in said first orientation.

13. The apparatus for preventing loss of contents from a container while container is conveyed though an automated system as recited in claim 12, wherein said means for holding said moveable puck cover assembly in said first orientation comprises:
  i: a first ferromagnetic structure disposed centrally on a downfacing surface on said counterweight; and
  ii: a second ferromagnetic structure disposed in an upfacing surface of said lower portion of said puck directly beneath said first ferromagnetic structure when said moveable puck cover assembly in said first orientation.

14. The apparatus for preventing loss of contents from a container while container is conveyed though an automated system as recited in claim 13, wherein at least one of said first ferromagnetic structure and said second ferromagnetic structure comprises a magnet.

15. The apparatus for preventing loss of contents from a container while container is conveyed though an automated system as recited in claim 14, wherein when said first ferromagnetic structure comprises a magnet, said second ferromagnetic structure comprises one selected from the group: a magnet of an opposite polarity to said magnet comprising said first ferromagnetic structure, and a ferromagnetic metal.

16. The apparatus for preventing loss of contents from a container while container is conveyed though an automated system as recited in claim 14, wherein when said first ferromagnetic structure comprises a ferromagnetic material, said second ferromagnetic structure comprises a magnet.

17. The apparatus for preventing loss of contents from a container while container is conveyed though an automated system as recited in claim 11, wherein said moveable puck cover assembly is caused to move between said first orientation and said second orientation by a first externally imposed force.

18. The apparatus for preventing loss of contents from a container while container is conveyed though an automated system as recited in claim 17, wherein said moveable puck cover assembly is caused to move between said second orientation and said first orientation by one selected from the group: a second, different externally imposed force, and withdrawal of said first externally imposed force.

19. The apparatus for preventing loss of contents from a container while container is conveyed though an automated system as recited in claim 11, further comprising:
  d) a container adapter for insertion into said opening in said top surface of said upper portion to adapt said opening to receive and retain a container having at least one different physical characteristic selected from the group: a different diameter, and a different height.

20. The apparatus for preventing loss of contents from a container while container is conveyed though an automated system as recited in claim 11, further comprising:

d) an orienting pin disposed at a location chosen from the group: on said upper portion of said puck, on said lower portion of said puck, and on said planar container cover.

21. A method of preventing loss of contents from a container while the container is conveyed though an automated system, the steps comprising:
a) providing a puck assembly comprising: a puck having an lower portion having a first dimension and an upper portion having a second dimension, said first dimension being larger than said second dimension, said upper portion having a top surface with an opening therein, said opening being sized and adapted to receive and retain a container therein; a moveable puck cover assembly comprising: a planar container cover; a pair of horizontal supports each having a proximal end fixed to said container cover and outwardly therefrom and diametrically opposed to one another; a pair of vertical pivot arms each having a proximal end connected to a distal end of one of said pair of horizontal supports; a pair of counterbalance weights, each of said pair of counterbalance weights being attached at a distal end of a respective one of said pair of vertical pivot arms; and a first portion of a pivot system disposed between said distal end and said proximal end of each of said pair of vertical pivot arms; a pair of second portions of a pivot system disposed on an outer vertical surface of said lower portion of said puck, said second portions of said pivot system interacting with respective ones of said first portions of said pivot;
b) placing a container having an open top in said opening in said top surface of said puck assembly;
c) moving said puck assembly on a conveyor system, said conveyor system configured to move said puck cover assembly from a first orientation wherein said planar container cover is positioned over said open top of said container to a second orientation wherein said open top in said container is uncovered;
d) moving said puck cover assembly into said second orientation;
e) with said puck cover assembly in said second orientation, performing one of the operations selected from the group: filling, inspecting, and capping.

22. The method of preventing loss of contents from a container while the container is conveyed though an automated system as recited in claim 21, the steps further comprising:
f) after said performing step (e), moving said puck cover assembly to said first orientation.

23. The method of preventing loss of contents from a container while the container is conveyed though an automated system as recited in claim 21, the steps further comprising:
f) providing an orientation pin on said puck assembly; and
g) prior to performing said moving said puck cover assembly step (d), utilizing said orientation pin to rotate said puck assembly to a desired angular relationship with to said conveyor system.

* * * * *